United States Patent [19]

Chin

[11] Patent Number: 4,986,698
[45] Date of Patent: Jan. 22, 1991

[54] SUBSEA PIPELINE METHOD AND APPARATUS

[75] Inventor: Arthur H. T. Chin, Houston, Tex.

[73] Assignee: Cooper Industries, Inc., Houston, Tex.

[21] Appl. No.: 159,224

[22] Filed: Feb. 23, 1988

[51] Int. Cl.$^5$ .............................................. F16L 1/26
[52] U.S. Cl. ...................................... 405/169; 29/523; 72/61
[58] Field of Search ............... 405/154, 158, 169, 170; 29/283.5, 516, 523; 72/58, 61, 63

[56] References Cited

U.S. PATENT DOCUMENTS

| | | | |
|---|---|---|---|
| 3,432,916 | 3/1969 | Fisher et al. ........................... | 29/516 |
| 4,155,669 | 5/1979 | Rochelle ............................... | 405/158 |
| 4,159,189 | 6/1979 | Todd et al. ............................ | 405/169 |
| 4,388,752 | 6/1983 | Vinciguerra et al. ............... | 29/421.1 |
| 4,648,626 | 3/1987 | Vinciguerra et al. ............. | 29/523 X |
| 4,662,663 | 5/1987 | Schmitz ............................... | 285/382.5 |
| 4,805,430 | 2/1989 | Schmitz et al. ........................ | 72/58 |

Primary Examiner—David H. Corbin

[57] ABSTRACT

An improved method and apparatus for repairing a subsea pipeline. The improved apparatus includes a forming tool having a body, a resilient sleeve surrounding the body, means for delivering fluid under pressure through the body to the interior of the resilient sleeve, a frame, an arm connected to the body of the forming tool and connected to a pressure responsive actuator supported from said frame to extend and retract the forming tool, a collet connector supported from said forming tool, a forming sleeve, the frame having means for supporting itself on the sea bottom, said collet connector being initially connected to said forming sleeve, means for controlling the supply of fluid under pressure to opposite sides of said actuator, means for injecting a fluid from said body into the space within said annular connecting means, and means on said frame for connecting lines thereto.

14 Claims, 4 Drawing Sheets

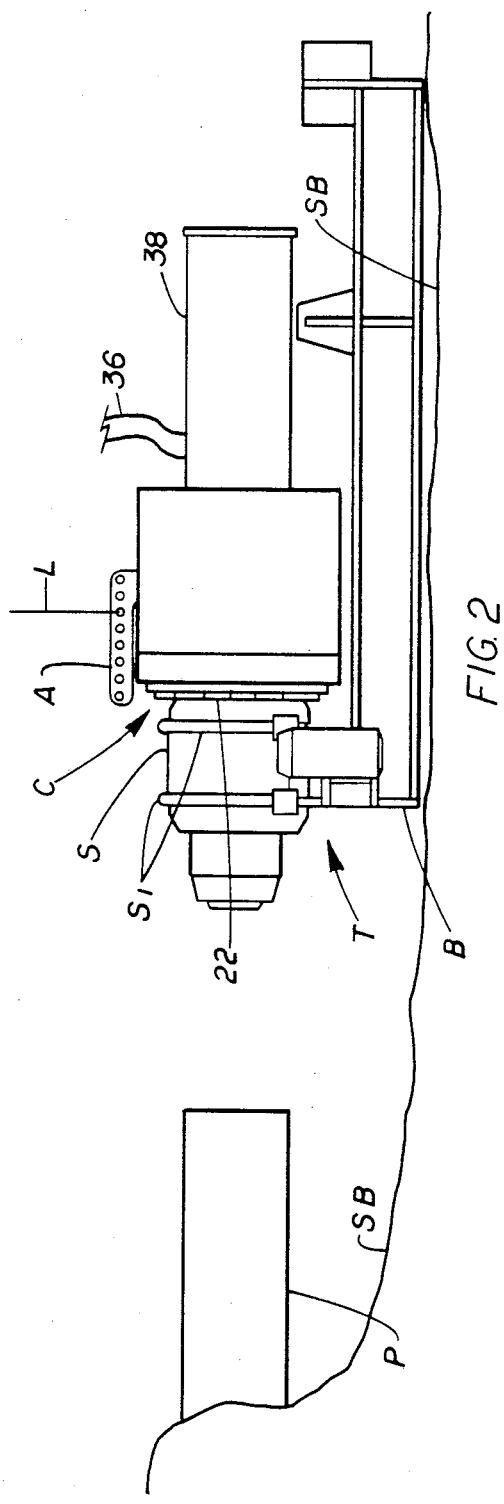
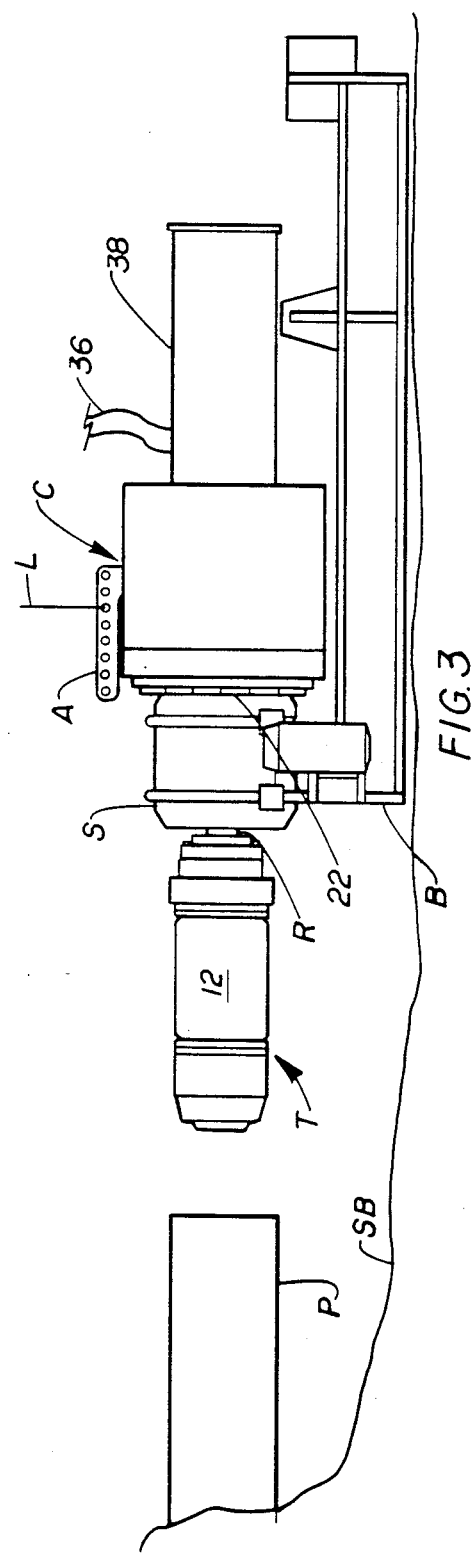
FIG. 2
FIG. 3

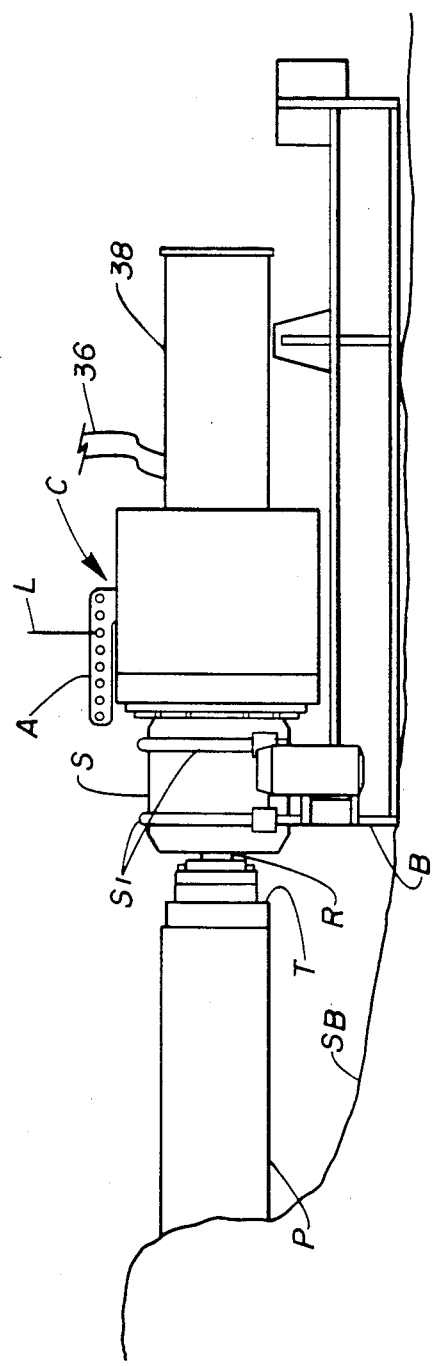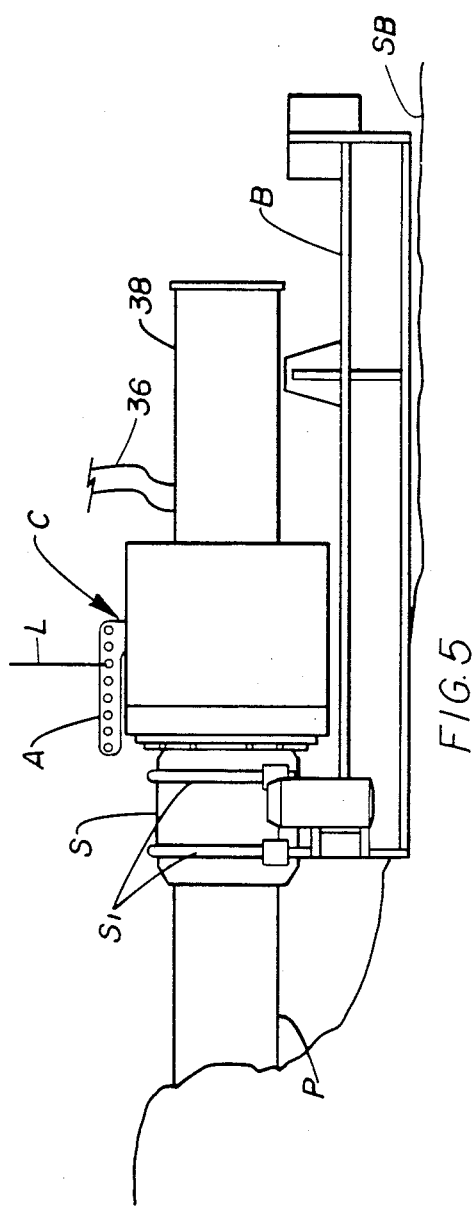

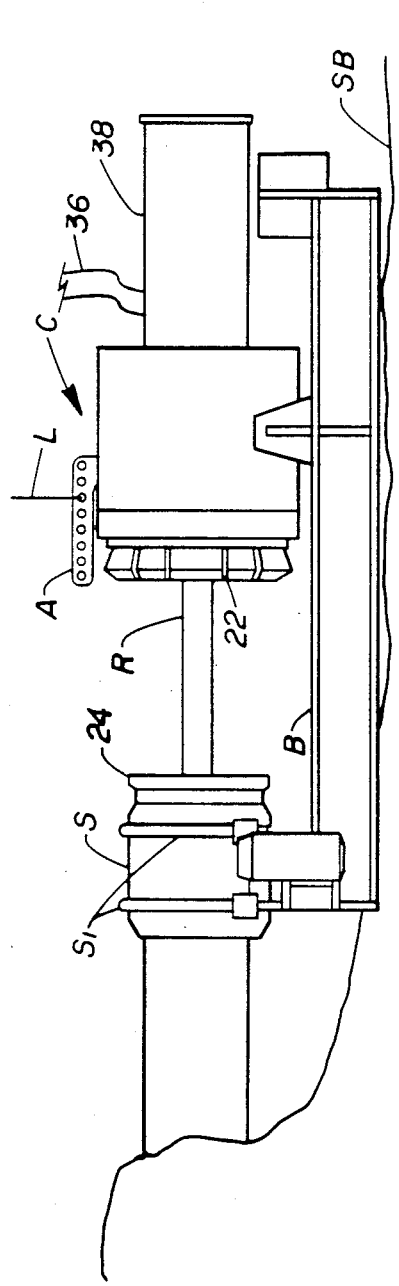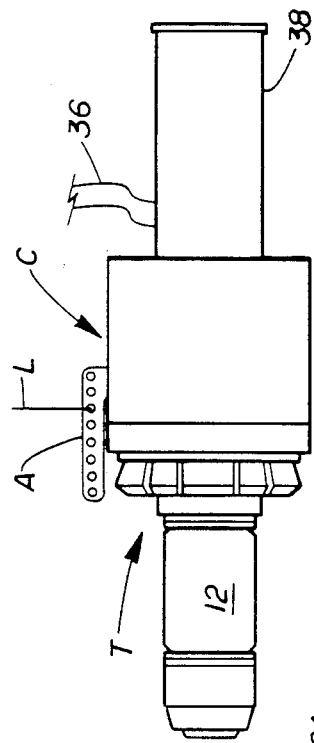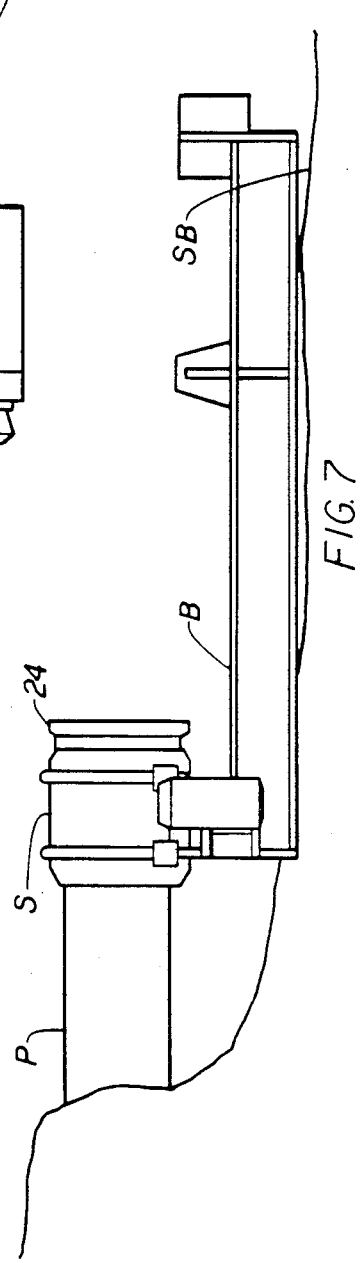

SUBSEA PIPELINE METHOD AND APPARATUS

BACKGROUND

The present invention relates to an improved method of repairing a subsea pipeline which involves pressure forming the end of a section of pipe into an annular connection member so that connection can be made to the pipe. The repair of subsea pipelines has been accomplished by the use of equipment manipulated from the surface and by direct manipulation of divers at the subsea location.

Normally a section of a pipeline is damaged or ruptured and such section is first cut from the pipeline by suitable apparatus at the subsea location. Thereafter it is necessary to prepare the cut ends of the pipeline for attachment to a replacement section of pipe which will be lowered to the subsea location and positioned between the open ends of the pipeline to replace the damaged section.

U.S. Pat. No. 4,662,663 to T. R. Schmitz discloses apparatus and method of providing the connection to the end of a subsea pipeline after the damaged section has been removed. Generally, such patent suggests that a tool be positioned within the end of the pipeline and the annular connector be positioned around the end of the pipeline and pressure be supplied to the tool to pressure form the end of the pipeline into tight sealing and gripping engagement with the interior of the connecting tool. Similar types of pressure forming is suggested in U.S. Pat. Nos. 3,432,916, and 4,388,752. Also, copending applications Ser. No. 07/098,197, filed Sept. 28, 1987 and Ser. No. 07/114,422, filed Nov. 28, 1987 have been directed to forming tools for pressure forming of tubular members within a well bore into surrounding annular members.

While such methods have been used, some difficulties have been encountered with their use in a subsea location. One difficulty is that it is a problem to mount the forming tool on a suitable frame and move it into the desired position with respect to the end of the pipeline which is to be deformed. A further problem encountered is that most subsea pipelines are at least partially embedded in the earth of the sea floor and the movement of the tool and the surrounding annular connector into position within and surrounding the open and of the pipeline has caused sand and other subsea floor detritus to enter into the interior profile of the annular connector. This presence of sand or other solid materials within the connector profile can prevent the formation of a proper sealing and gripping engagement with the end of the pipeline.

SUMMARY

The present invention relates to an improved method of and apparatus for repairing a subsea pipeline which includes the steps of positioning a forming tool having an actuator connected thereto, a sleeve positioned in alignment with the prepared end of the pipeline which is to be formed into the sleeve, and means releasably connecting the sleeve to the forming tool, extending the forming portion of the tool into the end of the pipeline, expanding the forming tool within the pipeline end, retracting the forming tool to pull the sleeve into position surrounding the end of the pipeline, cleaning the interior profile of the sleeve, forming the pipeline end outwardly into tight gripping and sealing engagement with the interior profile of the sleeve, hydrostatic and axial load testing of the formed joint, extending the forming tool to move the connecting means and actuator away from the end of the pipeline, releasing the forming tool from its engagement within the pipeline end, retracting the forming tool from within the end of the pipeline end. The improved apparatus includes a forming tool having a body, a resilient sleeve surrounding the body, means for delivering fluid under pressure through the body to the interior of the resilient sleeve, a rod connected to the body of the forming tool and connected to a pressure responsive actuator to extend and retract the forming tool, a connecting means supported from said forming tool, a forming sleeve, a frame having means for supporting itself on the sea bottom, means for mounting the forming sleeve on the frame, said connecting means being initially connected to said forming sleeve, means for controlling the supply of fluid under pressure to opposite sides of said actuator, means for injecting a fluid into the space within said sleeve, and means on said frame for connecting lines thereto.

An object of the present invention is to provide an improved method and apparatus for pressure forming the end of a pipe in a subsea location into the interior of an annular connecting means which minimizes the problems of handling the apparatus at the subsea location.

A further object is to provide an improved method and apparatus of the type described which simplifies the attaching of a connecting means to the open end of a pipeline at a subsea location.

Another object is to provide an improved method and apparatus of the type described which provides an initial pressure rounding of the end of the pipeline.

Still another object is to provide an improved method and apparatus of the type described which provides a power swaging of the end of the pipeline to ensure its rounding.

A still further object is to provide an improved method and apparatus of the type described which avoids problems encountered with the presence of solid materials within the sleeve into which the pipeline end is to be formed.

Still another object is to provide an improved method and apparatus for the connection of a connector sleeve to the end of a subsea pipeline which allows the pressure and axial thrust load testing thereof prior to the removal of the forming tool.

BRIEF DESCRIPTION OF THE DRAWINGS

These and other objects and advantages are hereinafter set forth and explained with respect to the drawings wherein:

FIG. 2 is a view of the improved apparatus positioned on the sea floor in alignment with the end of a pipeline which is to be formed into an annular connector.

FIG. 3 is a view of the apparatus with the forming tool partially extended toward the end of the pipeline.

FIG. 4 is a view of the apparatus with the forming tool positioned within the end of the pipeline but with the annular connecting means being ready for movement into position around the end of the pipeline.

FIG. 5 is a view of the apparatus with the annular connecting means in position around the end of the pipeline during the forming step.

FIG. 6 is a view of the apparatus with the annular connecting means formed on the end of the pipeline and with the forming tool being extended to move the remainder of the apparatus away from the end of the pipeline.

FIG. 7 is a view of the forming tool apparatus and its extension and retraction means being recovered from sea bottom and with the frame structure being positioned in supporting relationship to the end of the pipeline to assist in the alignment of the pipe section to be connected to the pipeline.

DESCRIPTION OF THE PREFERRED EMBODIMENT

Figure 1:
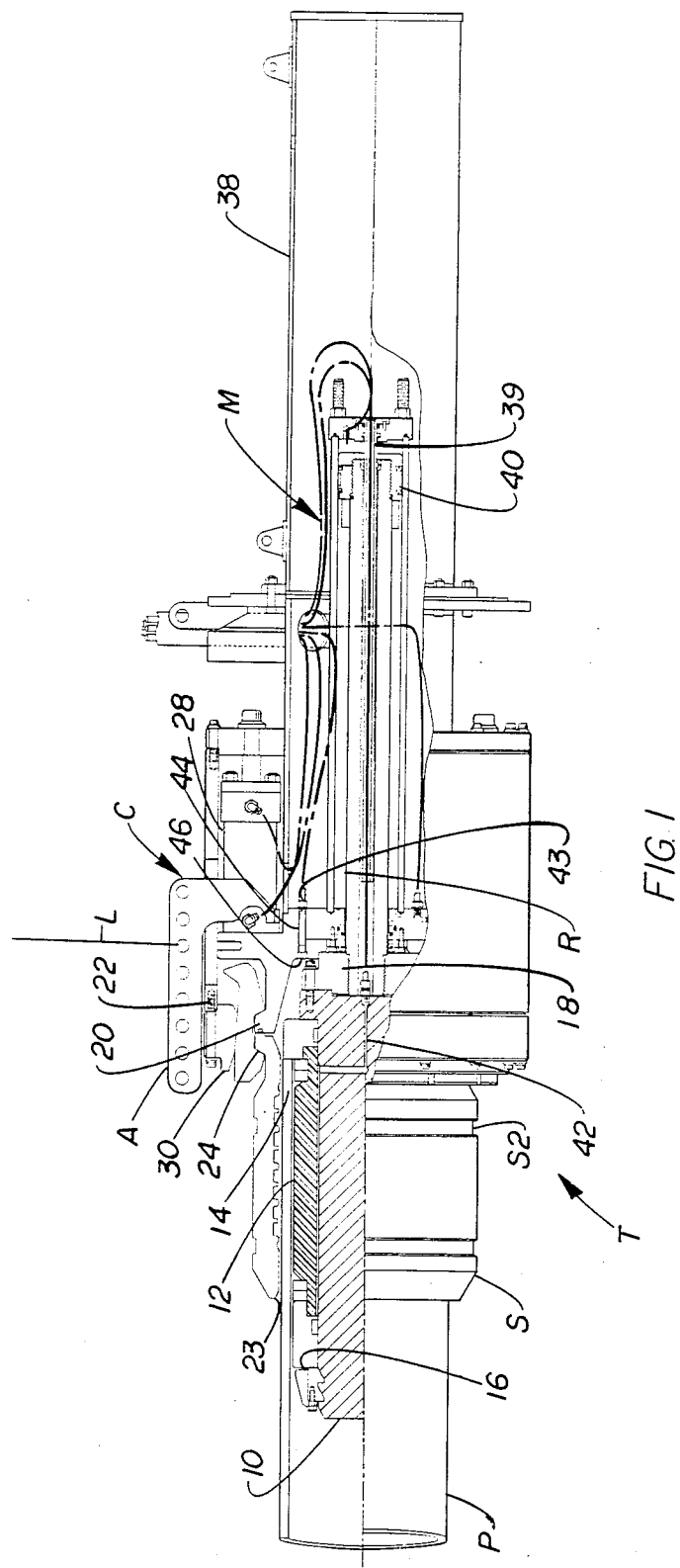
FIG. 1 is an axial sectional view of the improved forming tool and extension and retraction means of the present invention.

As shown in FIG. 1, forming tool T includes a body 10 with resilient sleeve 12 positioned between shoulder 14 and shoulder 16. Shoulder 14 extends radially outward from the exterior of sleeve 12 in its relaxed position to engage with the end of pipeline P when tool T is within the end of pipeline P in its desire forming position. Annular sleeve S which forms the annular means into which the end of pipeline P is to be formed is secured in position surrounding tool T by collet connector C which is supported from tool T as shown in FIG. 1. Lifting arm A is secured to flange F and has line L connected thereto which extends to the surface or to buoyancy devices (not shown) to allow the combined structure to have a neutral buoyancy. Tool T is connected to retraction and extension means M by piston rod R which extends through the interior of flange F collet connector C and through annular sleeve S. Base B is secured to sleeve S by straps S1 which are positioned within grooves S2 around the exterior of sleeve S.

Flange F is the connecting element for the assembly of the components of the structure as shown in FIG. 1. Retraction and extension means M or actuator M is secured to one side of flange by suitable connecting means such as bolts and rod flange 18 is secured to the end of rod R and is also secured to the inner end of tool body 10. Flange F includes an outer collet flange 20 which is engaged by the collet fingers 22. Collet fingers 22 also engage collet flange 24 on the end of forming sleeve S in the initial assembly of the components used in the method of this invention. Outer rim 26 of flange F provides the support for arm A and also for the actuators 28 which move the camming ring 30 to move the collet fingers 22 into and from engagement with flanges 20 and 24. Collet housing 32 surrounds outer rim 26 and connects between actuators 28 and camming ring 30. Suitable sealing means is provided in the end of collet flange 20 to seal against the end of forming sleeve S when it is engaged by collet connector C. Additionally this abutment of the end of sleeve S with the end of collet flange 20 provide the shoulder or stop 34 to properly position sleeve S with respect to tool T and collet connector C. Hose bundle 36 extends from the surface or a suitable control area (not shown) and through protective housing 38 surrounding actuator M. The individual hoses are connected to the elements which they are to pressurize. For example, one hose is connected to the extending side of actuator M and one is connected to the retracting side of actuator M; one hose is connected through tube 39 extending through the interior of actuator M and piston 40 thereof into port 42 in body 10 which communicates pressure to the interior of resilient sleeve 12; one hose is connected to each side of the actuators 28 of the collet connector C; and a hose is connected to each of a plurality of fittings 43 in flange F which communicate through ports 44 with the side of flange F facing tool T and sleeve S. The end of ports 44 includes a suitable jet fitting 46 which direct the flow of flow therefrom into a position between the interior of sleeve S and the exterior of pipeline P. Also, after the forming of the end of pipeline P into the interior of sleeve S, the joint between such members can be tested by pressure supplied through ports 44 and fittings 46.

As shown in FIG. 2, the damaged section of pipeline P has been removed and the end is exposed by removing the sand and other material of the sea bottom SB. It is recommended that the pipeline should be cut back to a position at which it appears that the pipe is generally round in section. With the pipeline P and sea bottom SB prepared as described and shown, the assembly of the base B, tool T, collet connector C, sleeve S and extending and retracting means M are maneuvered into position with the tool T, which extends partially from sleeve S, aligned with and close to the end of pipeline P. At this point the tool T is extended to be positioned within the end of pipeline so that its shoulder 14 engages the prepared end of pipeline P. FIG. 3 represents this movement of tool T toward this position. With tool T positioned within pipeline P, the expandable annulus or sleeve 12 is expanded into tight engagement with the interior of pipeline P. The pressure used for this expansion is substantially less than the pressure used subsequently for the pressure forming of the end of pipeline P into the interior of sleeve S. The pressure is also sufficient to securely retain tool within pipeline P and to reposition the remainder of the assembly into more perfect alignment with pipeline P. Additionally, this pressure is preselected to be sufficient to provide a reforming of the end of pipeline P into a more rounded configuration. The means M is then actuated to retract tool T and the position shown in FIG. 4 illustrates this retraction prior to the movement of sleeve S into surrounding relationship with the end of pipeline P which is shown in FIG. 5.

The retraction of tool T is continued until the retraction of rod R is complete and sleeve S is in position around the end of pipeline P. As set forth above, the tapered surface 23 on the interior leading surface of sleeve S causes a further rounding of the exterior of pipeline P as it is forced into its position During retraction of tool T, fluid is jetted through ports in flange F and through the interior of sleeve S and the exterior of the end of pipeline P to scour away debris from the sleeve interior profile and the exterior pipe surface. Thereafter, tool T is actuated to forming pressures and the end of pipeline P is formed radially outwardly into tight gripping and sealing engagement with the profile on the interior of sleeve S. The presence of the collapsible material in the grooves of the sleeve internal profile prevents the water from forming a hydraulic lock which would interfere with the proper completion of the forming of the end of pipeline P into the internal profile of sleeve S.

With completion of the forming step, the joint is hydrostatically and axially loaded to prove its integrity. Tool pressure is reduced to a value of approximately 500 psi above the hydrostatic pressure applied through ports 44. This hydrostatic pressure causes an axial force against shoulder 14. Joint leakage is shown by a reduction of the applied hydrostatic pressure. Joint failure as a result of axial load will be indicated if the pressure to retract actuating means M increases. If there is a failure indicated in the testing the forming step can be repeated. With the completion of the hydrostatic test and the release of collet connector C from engagement with sleeve S, means M is actuated to extend tool T which causes the movement of collet connector C away from the end of pipeline P and sleeve S to the position shown in FIG. 6. Thereafter, the venting of pressure from tool T allows disengagement of tool T from the interior of the end of pipeline P. Then means M is actuated to retract tool T from within pipeline P and back to its retracted position as shown in FIG. 7.

From this it can be seen that the present invention does provide an assurance of full alignment of the forming tool and the connecting sleeve with the end of the pipeline, the at least partial rounding of the end of pipeline P with the initial pressuring of the tool T, the swaging action of the forcing of the connecting sleeve S onto the exterior of pipeline P for final rounding of the pipeline end and the support of the sleeve S and the pipeline end by the base B which is left connected to sleeve S and in supporting relationship thereto. The provision of the internal jetting of fluids through the interior of sleeve S after it is installed on pipeline P will cause the removal of all sand, earth and other materials, which would be detrimental to the forming step. to be removed therefrom.

What is claimed is:

1. The method of providing a connection element to the end of a damaged subsea pipeline after the removal of the damaged section including the steps of
   positioning an assembly of an internal forming tool, an extending and retracting actuator connected to said forming tool substantially aligned with the end of the pipeline, and a connection sleeve element on the sea bottom in close relationship to the end of the pipeline,
   extending said forming tool into the end of said pipeline,
   expanding the forming portion of said forming tool into tight engagement with the interior of said pipeline,
   retracting the forming tool to pull the assembly close to the end of said pipeline, to position the connection sleeve element in surrounding relationship to the pipeline and to provide a shoulder against which a forming sleeve is to abut during forming,
   expanding the forming portion of said tool into forming engagement with the interior of said pipeline end to form it radially outward into gripping and sealing engagement with the interior of said connection sleeve element,
   extending said actuator to move said actuator away from the end of the pipeline and from said connection sleeve element,
   releasing forming pressure from said forming tool, and
   thereafter retracting said actuator to remove said forming tool from within the end of said pipeline.

2. The method according to claim 1 wherein said connection sleeve element is releasably connected to said forming tool and said actuator and including the steps of
   moving said connection sleeve element into surrounding relationship around the end of said pipeline in said second retracting step, and
   releasing the connection to said connection sleeve element after said forming step.

3. The method according to claim 2 including the step of
   flushing the interior of said connection sleeve element during and after its positioning in surrounding relationship to said pipeline end.

4. The method according to claim 1 wherein sufficient pressure is applied in said initial expanding step to provide a rounding of the end of the pipeline.

5. The method according to claim 2 wherein the step of retracting to position said connection sleeve element in surrounding relationship to the end of the pipeline is done with sufficient force so that out-of-round portions of said pipeline end are swaged by the sleeve element into a round shape.

6. The method according to claim 1 including the step of
   exerting testing pressure against the end of the pipeline and the connection sleeve element while said forming tool is in its expanded condition after said forming step to test the effectiveness of the sealing engagement of the pipeline end within said connection sleeve element.

7. An apparatus for securing a connector on the open end of a subsea pipeline comprising
   a pressure forming tool having a body, a resilient sleeve carried in surrounding relationship to said body and means for delivering pressure to the interior of said resilient sleeve,
   an outer forming sleeve,
   an actuator to extend and retract pressure forming tool with respect to said outer forming sleeve, and
   means releasably connecting the actuator to said outer forming sleeve.

8. An apparatus according to claim 7 including
   said forming sleeve having an interior profile into which the subsea pipeline is to be pressure formed and an exterior collet flange.

9. An apparatus according to claim 7 including means associated with said forming tool for introducing fluid jets into the interior of said forming sleeve as and after it is positioned in surrounding relationship to the pipeline which is to be formed therein.

10. An apparatus according to claim 8 wherein said releasable connecting means between said actuator and said outer forming sleeve is a collet connector.

11. An apparatus according to claim 7 including
    a support flange mounted within said collet connector, and
    means for securing said actuator to said support flange,
    said actuator having a connecting rod extending slidably through said support flange and being secured to said forming tool.

12. An apparatus for securing a connector on the open end of a subsea pipeline comprising
    a pressure forming tool having a body, a resilient sleeve carried in surrounding relationship to said body and means for delivering pressure to the interior of said resilient sleeve,
    an outer forming sleeve,
    an actuator to extend and retract said forming tool with respect to said outer forming sleeve,
    a collet connector surrounding said actuator and connected thereto by a support flange,
    said forming sleeve having an internal profile into which a pipe is to be formed and an external collet flange, and a base connected to said sleeve in supporting relationship thereto.

13. An apparatus according to claim 12 including
said support flange being a collet flange, and
means connecting said actuator to said support flange,
said collet connector engaging said collet flange on said support flange and said collet flange on said forming sleeve to secure said forming sleeve in abutment to said support flange.

14. An apparatus according to claim 13 including
ports extending through said support flange and being directed toward the interior of said forming sleeve which is engaged by said collet connector so that fluids ejected through said ports will flush sediment and other bottom solids from the interior of said forming sleeve.

* * * * *